(12) United States Patent
Wenzelburger

(10) Patent No.: US 11,571,754 B2
(45) Date of Patent: Feb. 7, 2023

(54) SINGLE-LIP DEEP-HOLE DRILL WITH A CHAMFERED RAKE FACE

(71) Applicant: botek Praezisionsbohrtechnik GmbH, Riederich (DE)

(72) Inventor: Juergen Wenzelburger, Metzingen (DE)

(73) Assignee: botek Praezisionsbohrtechnik GmbH, Riederich (DE)

( * ) Notice: Subject to any disclaimer, the term of this patent is extended or adjusted under 35 U.S.C. 154(b) by 0 days.

(21) Appl. No.: 16/617,105

(22) PCT Filed: May 29, 2018

(86) PCT No.: PCT/EP2018/064036
§ 371 (c)(1),
(2) Date: Nov. 26, 2019

(87) PCT Pub. No.: WO2018/219926
PCT Pub. Date: Dec. 6, 2018

(65) Prior Publication Data
US 2020/0254533 A1    Aug. 13, 2020

(30) Foreign Application Priority Data

May 29, 2017 (DE) .................. 10 2017 111 630.3

(51) Int. Cl.
*B23B 51/06* (2006.01)
*B23B 51/00* (2006.01)

(52) U.S. Cl.
CPC ............ *B23B 51/066* (2022.01); *B23B 51/00* (2013.01); *B23B 2251/085* (2013.01);
(Continued)

(58) Field of Classification Search
CPC .............. B23B 51/00; B23B 2251/085; B23B 2251/424; B23B 51/066; B23B 2251/14;
(Continued)

(56) References Cited

U.S. PATENT DOCUMENTS 1,513,350 A * 10/1924 Stolle ...................... B23B 41/02
                                                                        408/1 R
2,418,021 A *  3/1947 Fleischer ............ B23B 51/0486
                                                                        408/59
(Continued)

FOREIGN PATENT DOCUMENTS

DE      7905118 U1     5/1979
DE      4413932 A1     8/1995
(Continued)

OTHER PUBLICATIONS

International Search Report and Non-Translated Written Opinion Form PCT/IS/210 and PCT/ISA/237, International Application No. PCT/EP2018/064036, pp. 1-11, International Filing Date May 29, 2018, dated Aug. 27, 2018..

*Primary Examiner* — Eric A. Gates
(74) *Attorney, Agent, or Firm* — George McGuire

(57) ABSTRACT

The invention relates to a single-lip drill with an inner and an outer rake face. Very good hole straightness deviation values and endurance are obtained with the ground face according to the invention.

15 Claims, 9 Drawing Sheets

(52) U.S. Cl.
CPC ..... *B23B 2251/14* (2013.01); *B23B 2251/201* (2013.01); *B23B 2251/48* (2013.01); *B23B 2251/56* (2013.01)

(58) Field of Classification Search
CPC .......... B23B 2251/201; B23B 2251/48; B23B 2251/56
See application file for complete search history.

(56) References Cited

U.S. PATENT DOCUMENTS

| | | | | |
|---|---|---|---|---|
| 4,373,839 | A * | 2/1983 | Negishi | B23B 51/02 408/205 |
| 4,565,471 | A | 1/1986 | Negishi et al. | |
| 5,443,585 | A * | 8/1995 | Kawase | B23B 51/04 408/199 |
| 7,195,428 | B2 * | 3/2007 | Astakhov | B23B 51/0486 408/229 |
| 7,753,627 | B2 * | 7/2010 | Randecker | B23B 51/0486 408/199 |
| 9,028,179 | B2 * | 5/2015 | Wada | B23B 51/00 408/223 |
| 9,339,875 | B2 * | 5/2016 | Eggemann | B23P 6/00 |
| 9,421,621 | B2 * | 8/2016 | Wenzelburger | B23B 51/04 |
| 9,669,474 | B2 * | 6/2017 | Wenzelburger | B23B 51/0486 |
| 10,265,781 | B2 * | 4/2019 | Deeg | B23B 51/0486 |
| 2004/0091327 | A1 | 5/2004 | Astakhov et al. | |
| 2013/0309029 | A1 | 11/2013 | Wenzelburger et al. | |

FOREIGN PATENT DOCUMENTS

| | | | |
|---|---|---|---|
| DE | 10316116 | A1 | 10/2004 |
| DE | 102010051248 | A1 | 6/2011 |
| JP | S629811 | A | 1/1987 |
| JP | S6234712 | A | 2/1987 |
| JP | H0724970 | B2 | 3/1995 |
| JP | H0825120 | A | 1/1996 |
| JP | 11267913 | A * | 10/1999 |
| WO | 2016012462 | A1 | 1/2016 |
| WO | 2016128462 | A1 | 8/2016 |

* cited by examiner

Ansicht A

Schnitt B - B

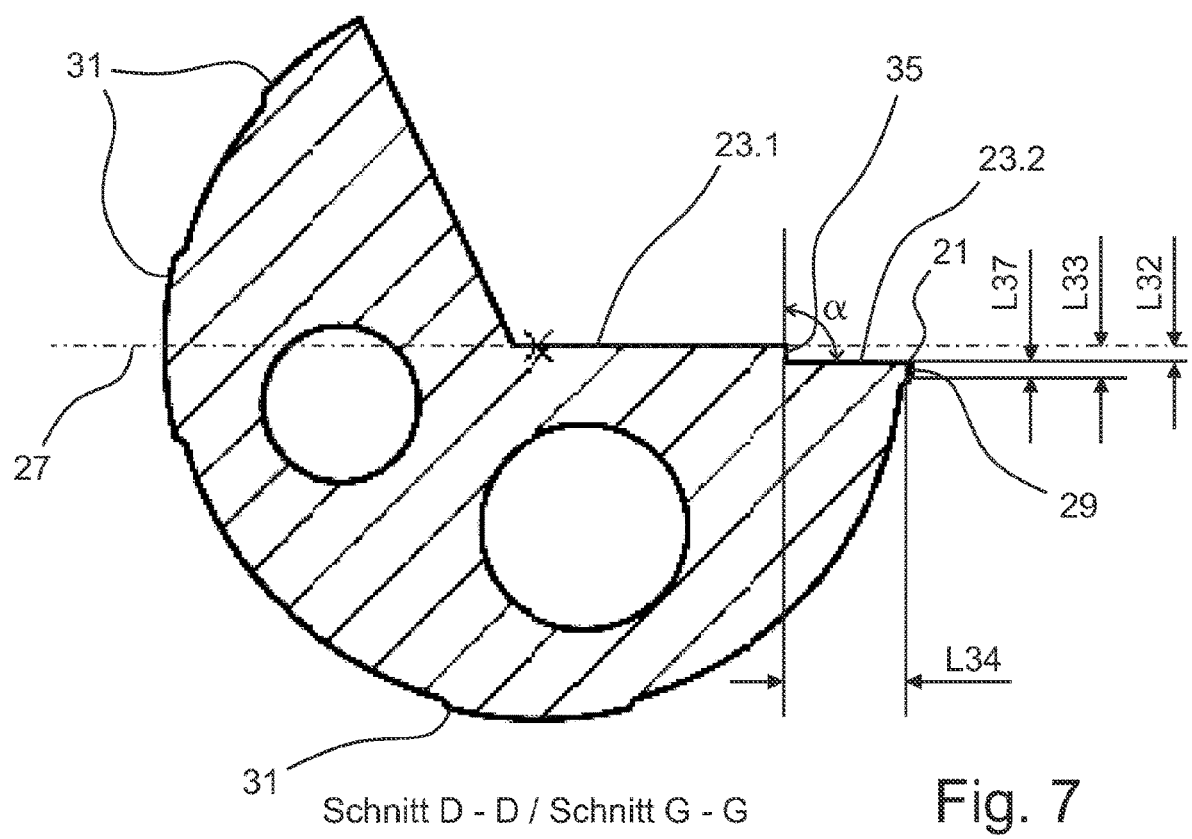
Schnitt D - D / Schnitt G - G       Fig. 7
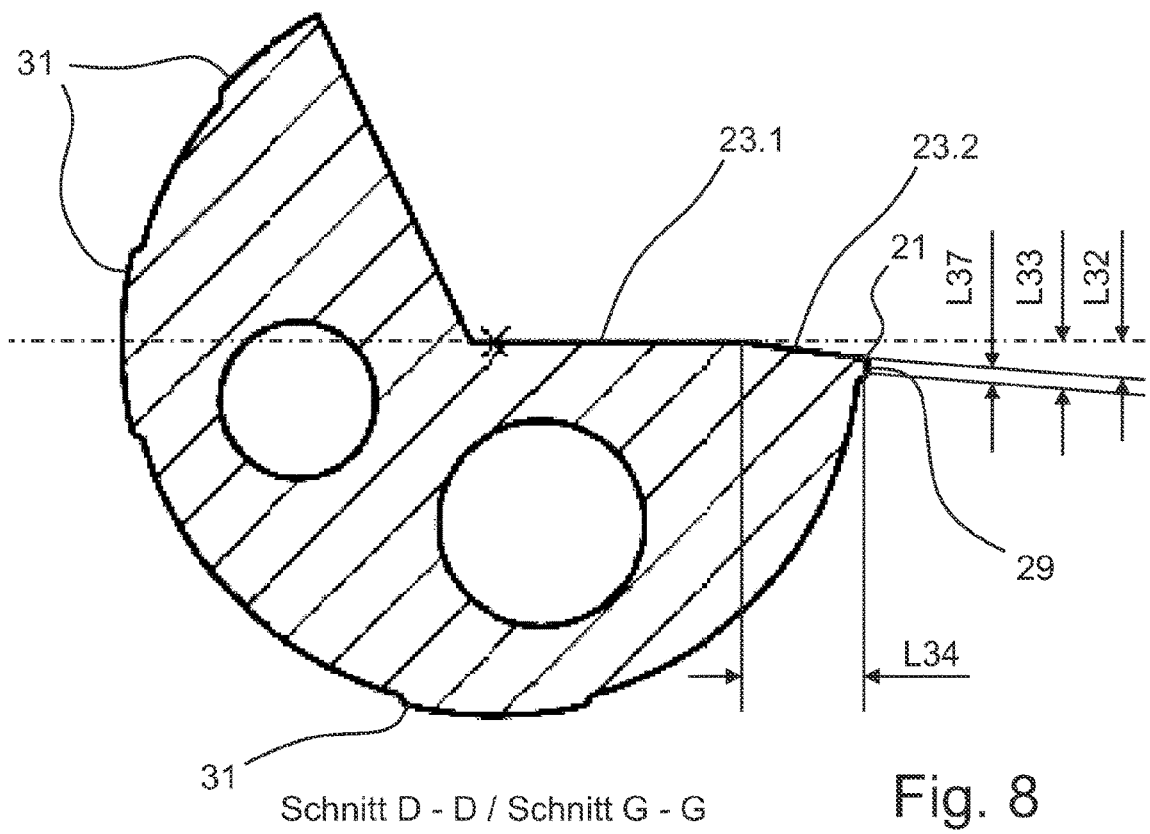
Schnitt D - D / Schnitt G - G       Fig. 8

Schnitt F - F

Schnitt F - F

Ansicht E

Einzelheit X

SINGLE-LIP DEEP-HOLE DRILL WITH A CHAMFERED RAKE FACE

CROSS-REFERENCE TO RELATED APPLICATIONS

This application is a US national phase application of international patent application number PCT Application No.: PCT/EP2018/064036, filed on May 29, 2018, which claims priority to German Patent Application No. 10 2017 111 630.3, filed May 29, 2017, the disclosures of both of which are incorporated herein by reference in their entireties.

BACKGROUND

The invention relates to a single-lip drill, which is characterized in that the boreholes made with it are very straight or, in other words, have a particularly small hole straightness deviation.

The essential terms for the disclosure of the invention are explained inter alia in connection with the description of the figures. In addition, at the end of the description of the figures, individual terms are explained in the manner of a glossary.

DE4413932A1 (Mitsubishi) discloses a single-lip drill having axial structures mounted on the rake face in the direction of the central axis of the single-lip drill. These structures are used to shape the chips and have the goal of allowing a higher feed of the drill by favorable shaping of the chips. The profile of the structure is very complex and special grinding wheels are necessary for production. Since the profile is dependent on the diameter, a separate grinding wheel is required for each drill diameter. This makes the production very complicated and expensive. Despite the structures, the minor cutting edge is on the rake face plane of the tool.

From JP8025120A (Mitsubishi), another single-lip drill is known which has a rake face that slopes upward towards the periphery of the drill. The minor cutting edge is thus above the rake face plane. Thus, a shaping of smaller and more favorable chips which can be better dissipated can also be obtained. Also, this shaping of the rake face extends in the direction of the central axis of the drill and in turn depends on the diameter of the drill, so that a separate grinding wheel is necessary for each diameter. This in turn makes the production very complicated and expensive.

The common advantage of single-lip drills according to DE4413932A1 and JP8025120A is that the structure is retained in the end-side regrinding and the regrinding can be done on a simple machine.

From DE 10316116 A1 (TBT) a single-lip drill is known which has a chip former that extends parallel to the outer cutting edge and thus transversely to the central axis of the single-lip drill. Such a chip former extends over most of the outer cutting edge and may have a width significantly greater than 1 mm, for example 2 mm.

This embodiment of a chip former should also lead to a favorable shaping of chips and thus allow faster processing.

However, the production of such a chip former must be very precise and therefore takes place predominantly on numerically controlled (CNC) machines. Because the chip former is parallel to the outer edge, when such a single-lip drill is reground, the drill head must be ground by an amount at least equal to the width of the chip former so that a new chip former can be ground into the "untouched" rake face.

This makes re-sharpening time-consuming and expensive and leads to this single-lip drill being suitable only for very few regrinds.

The known chip formers all aim to attain a favorable shaping of the chips and are thus intended to enable a faster machining (=larger machining volume per unit of time).

The hole straightness deviation of the boreholes produced with a single-lip drill is an important aspect of bore quality. The hole straightness deviation during the drilling process is the deviation of the center axis of the actual borehole from the theoretical position of the borehole. The hole straightness deviation is indicated in millimeters [mm]. An effort is made to obtain the smallest possible hole straightness deviation. Ideally, the actual hole is exactly where it should be, and the hole straightness deviation is zero. Single-lip drills are distinguished from other drills by a comparatively small hole straightness deviation.

SUMMARY OF THE INVENTION

Object of the Invention

The object of the invention is to provide a single-lip drill having particularly low hole straightness deviation values in conjunction with a particularly small dispersion of the hole straightness deviation. It should also have a very simple ground face and be easily and inexpensively reground.

In a single-lip drill of the type described above, the object is achieved according to the invention in that the rake face comprises an inner rake face and an outer rake face, that the inner rake face is radially to the inside and in the immediate vicinity of the central axis, that the outer rake face is radially to the outside and adjoins the inner rake face, that the inner rake face is in a view from the front toward the drill head in the immediate vicinity of a rake face plane, and that the outer rake face in a view from the front toward the drill head at least in the region of the minor cutting edge is below the rake face plane.

It has been found in drilling tests that these measures, which are easy to implement in terms of manufacturing technology, produce a drastic reduction of the hole straightness deviation while simultaneously increasing the service life of the single-lip drill according to the invention. This effect is explained and quantified with reference to FIGS. 13 and 14.

The further developments according to the invention of a single-lip drill known from the prior art comprise grinding one or more additional surfaces into the rake face on the drill head. All these additional surfaces extend in the direction of the central axis of the drill (or by modification of the rake face of a single-lip drill) and can be produced in several successive steps with simple grinding wheels, which are moved in the axial direction relative to the drill head. As a result, the production of these surfaces (s) can be done relatively easily and cheaply. There are no special grinding wheels required; with a few (cylindrical) grinding wheels, a wide range of diameters can be covered. In addition, the drill head can remain clamped just as when the rake face is being ground.

Furthermore, the surfaces can also be subsequently applied to an existing single-lip drill.

Another advantage is that the ground face has a prismatic shape. This leads to the additional advantage that no regrinding of the rake faces is required along with the front-side regrinding of a single-lip drill according to the invention, but only the clearance face must be ground enough that the dulled cutting edge is sharp again. In many cases, it is sufficient if 0.3 mm or 0.5 mm are removed. This saves time and costs during regrinding. In addition, the single-lip drill according to the invention can be reground very frequently. The regrinding can be done on a simple machine.

The shape of the rake face of the single-lip drill according to the invention may be described in a cross-section to the central axis as follows and extends at least over a part of the drill head in the direction of the central axis of the drill.

The rake face is divided into an inner rake face extending radially from the central axis toward the periphery of the drill and an outer rake face extending radially from the circumference of the drill bit toward the central axis of the drill.

The inner rake face is flat, runs parallel to the central axis of the drill and coincides approximately with the rake face plane. This makes it possible to drill boreholes in full and to cut to the center. In order to prevent the drill from pressing during cutting, the inner rake face is usually located at a distance of about 0.01 mm to 0.05 mm below the rake face plane.

The outer rake face is also made flat and arranged parallel to the central axis of the drill. Depending on the application, it can extend from the tip of the drill head in the axial direction over the entire length of the drill head or only over part of the length of the drill head.

The outer rake face according to the invention is designed so that the minor cutting edge of the single-lip drill has a distance from the rake face plane greater by at least 0.05 mm than the inner rake face. This is obtained by offsetting the outer rake face with respect to the inner rake face and/or tilting the outer rake face with respect to the inner rake face.

Advantages of the Invention

As a result of this geometric change compared to a conventional single-lip drill, the direction and magnitude of the force vectors acting on the outer cutting edge change in the cutting process.

The single-lip drill according to the invention is distinguished by the following positive properties compared to a conventional single-lip drill:
  Reduction of the hole straightness deviation of the borehole.
  Reduction of the dispersion of the hole straightness deviation.
  Reduction of wear on the cutting edge in the region of the outer cutting edge.
  Easy production and easy regrinding.

In a first embodiment, the outer rake face is parallel to the inner rake face, but the distance from the central axis is greater than the distance of the inner rake face from the central axis. This creates a set-off that is bridged by a parting plane between the outer and inner rake faces. The angle of this parting plane to the outer rake face may be 90° or more.

In a second embodiment, the outer rake face is disposed at an angle to the inner rake face. In both embodiments, it is provided that the minor cutting edge, i.e. the contact line of outer rake face and circular land, is about half the width of the circular land below the central axis of the drill. The width of the circular land is thereby reduced to about half.

In further embodiments, a groove with an arcuate cross-section may additionally be placed between the outer and the inner rake faces. This groove is called a chip breaker groove, can simplify the production of the outer rake face and additionally leads to a shaping of the chips. Depending on the application, this groove can extend from the tip of the drill head over the entire length of the drill head or only over a portion of the length of the drill head.

Overall, one can divide the rake faces according to the invention into four basic structures:
  1. Inner rake face and outer rake face are parallel to each other; no chip breaker groove is present.
  2. Inner rake face and outer rake face form an obtuse angle; no chip breaker groove is present.
  3. Inner rake face and outer rake face are parallel to each other; chip breaker groove is present.
  4. Inner rake face and outer rake face form an obtuse angle; chip breaker groove is present.

Excellent hole straightness deviation values have been attained with all of these embodiments.

A further significant improvement in the hole straightness deviation can be attained by reducing the width of the circular land. In some cases, the width of the circular land was reduced to anywhere from 0.1 mm to 0.2 mm. Improved hole straightness deviations were again obtained with these very narrow circular lands. This surprising effect also contributes to it being possible to regrind conventional single-lip drills in such a way that an outer rake face according to the invention is produced. When standard commercially available single-lip drills are reground to form single-lip drills according to the invention, the width of the circular land is inevitably reduced.

It would appear that this will change the frictional forces and pressures acting on the circular land compared to a single-lip drill known from the prior art.

Other embodiments may be apparent from the possible modifications described below and may be combined with each other in various ways.

The outer rake face, the chip breaker groove, the guide pads and/or the circumference of the drill head or the entire drill head can be provided with a functional coating (wear protection).

The outer rake face extends axially only over a small portion of the drill head; for example, only over ¼ of the drill diameter.

The drill head has one group or two groups of guide pads. If the drill head has two groups of guide pads on the periphery, then one group is arranged in the region of the drill tip and the second group is arranged in the axial direction at a distance from the first group in the direction of the clamping sleeve.

These guide pads of the first group and/or the second group may additionally have a taper towards the rear end or be cylindrical.

The arrangement of the guide pads on the periphery of the first and the second group may differ. The two regions can directly adjoin each other, or there may be a set-off between the two regions.

On an actual single-lip drill according to the third embodiment, the following dimensions were used:
D=9 mm
L1=3 mm
L32=0.2 mm
L33=0.4 mm
L34=1.5 mm
L35=0.3 mm
L36=1.5 mm
L37=L33−L32=0.2 mm The dimensions are entered in FIGS. 2, 3 as well as 7 to 10.

Two groups of guide pads.
Drilling head coated on the circumference.
Outer rake face and chip breaker groove uncoated.

The length of the chip breaker groove corresponds to the length of the region with the first group 47 of guide pads. The ground face is uncoated.

With this tool, a significant improvement in the hole straightness deviation and in particular the scattering of the hole straightness deviation was attained (see FIG. 14).

Further details, features and advantages of the subject matter of the invention will become apparent from the subclaims and from the following description of the accompanying drawings, in which—by way of example—a plurality of exemplary embodiments of the invention are shown.

BRIEF DESCRIPTION OF THE DRAWINGS

In the drawings:
FIGS. 5 to 12 show exemplary embodiments of single-lip drills according to the invention and
FIGS. 13 and 14 show diagrams for illustrating the advantages of the single-lip drills according to the invention.

DESCRIPTION OF THE EXEMPLARY EMBODIMENTS

Figure 1:
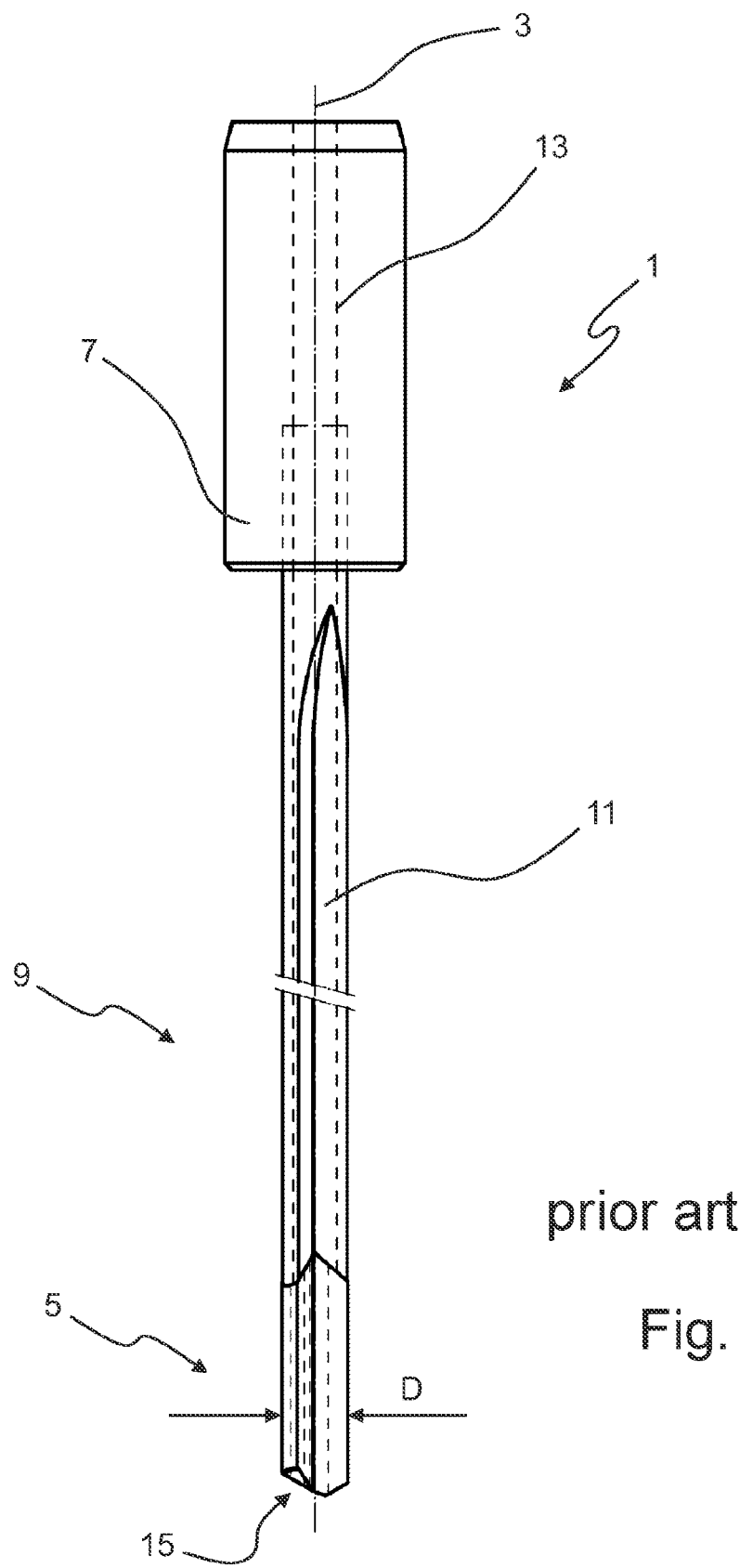
FIGS. 1 to 4 show a single-lip drill (prior art)

In all figures, identical reference numerals are used for the same elements or components.

FIG. 1 shows a single-lip drill provided in its entirety by the reference numeral 1. A central axis 3 is at the same time also the axis of rotation of the single-lip drill 1 or of the workpiece (not shown) if it is set in rotation during drilling.

A diameter of the single-lip drill 1 is denoted by D. The single-lip drill 1 is composed of three main components, namely a drill head 5, a clamping sleeve 7 and a shank 9.

The shank is usually made of steel or of the same or a similar material as the drill head. Shanks made of steel are usually produced by forming a profiled tube with a V-shaped groove.

The shank transmits the torque from the clamping sleeve, which is driven by the machine spindle, to the cutting edge(s) formed on the drill head, at which the cutting action takes place.

The clamping sleeve is usually made of steel or the same material as the shank. It is usually cylindrical and is used for being held in a clamping device of the spindle of the machine tool.

In the illustrated embodiment, the drill head 5, the clamping sleeve 7 and the shank 9 are three different components that have been joined together by soldering, gluing or other joining methods to form the single-lip drill 1. However, it is also possible to produce, for example, the shank 9 and the drill head 5 in one piece. Likewise, it is also possible to produce the clamping sleeve 7 and the shank 9 in one piece. But it is also possible to produce the entire single-lip drill 1 in one piece.

The outer surfaces of the drill head, shank and clamping sleeve are arranged largely centrically or coaxially with respect to the central axis 3.

In the shank 9 and the drill head 5, a longitudinal groove 11 is present, which is also referred to as a bead. The longitudinal groove 11 has a cross-section approximately in the form of a circular segment with an angle usually from about 90° to 130°. The longitudinal groove 11 extends from the tip of the drill to just in front of the clamping sleeve 7. Because of the longitudinal groove, drill head 5 and shank 9 have a cross-section approximately in the shape of a circular segment with an angle of usually 230° to 270° (supplementary angle to the angle of the longitudinal groove).

A cooling channel 13 extends over the entire length of the single-lip drill 1. At a front end of the clamping sleeve 7, coolant or a mixture of coolant and air is conveyed under pressure into the cooling channel 13. The coolant or the mixture of coolant and air exits back out from the cooling channel 13 at the opposite front end 15. The coolant has a plurality of purposes. It ensures cooling and lubrication of the cutting edge and the guide pads. In addition, it transports the chips produced during drilling out of the borehole via the longitudinal groove 11.

Figure 2:
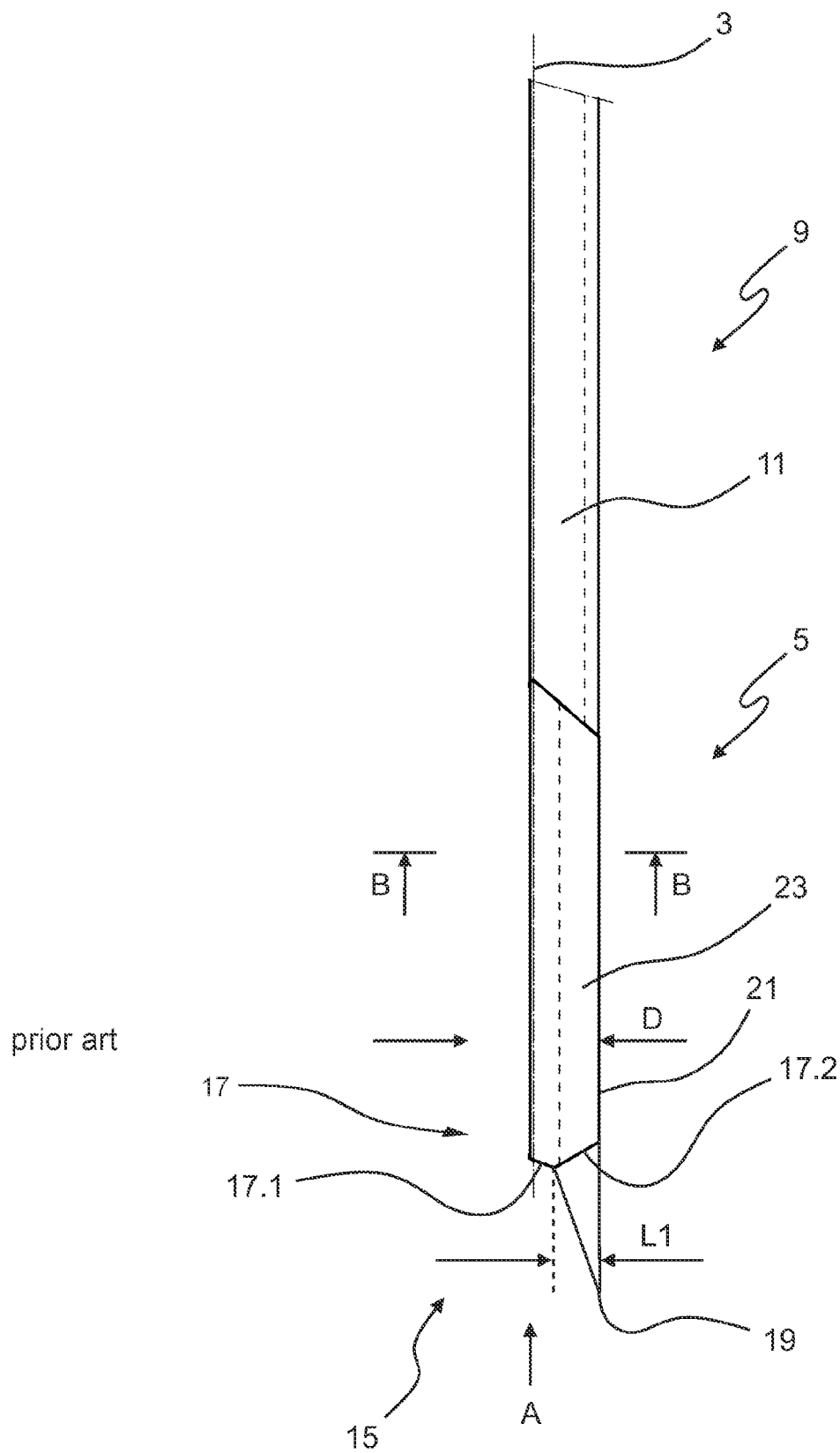

The front end 15 is shown slightly enlarged in FIG. 2. Based on this figure and the associated front or sectional views (FIGS. 3 and 4), elements of the drill head 5 are explained in detail below.

A cutting edge 17 as a whole has the reference numeral 17. The cutting edge 17 in single-lip drills 1 usually consists of an inner cutting edge 17.1 and an outer cutting edge 17.2.

A cutting tip bears the reference numeral 19. As usual with single-lip drills, the cutting tip 19 is arranged radially spaced apart from the central axis 3. The inner cutting edge 17.1 extends from the central axis 3 to the cutting tip 19. The outer cutting edge 17.2 extends from the cutting tip 19 going out in the radial direction to the outer diameter of the drill head 5 and ends at a minor cutting edge 21.

A distance of the cutting tip 19 from the minor cutting edge 21 is indicated in FIG. 2 by $L_1$.

Figure 3:
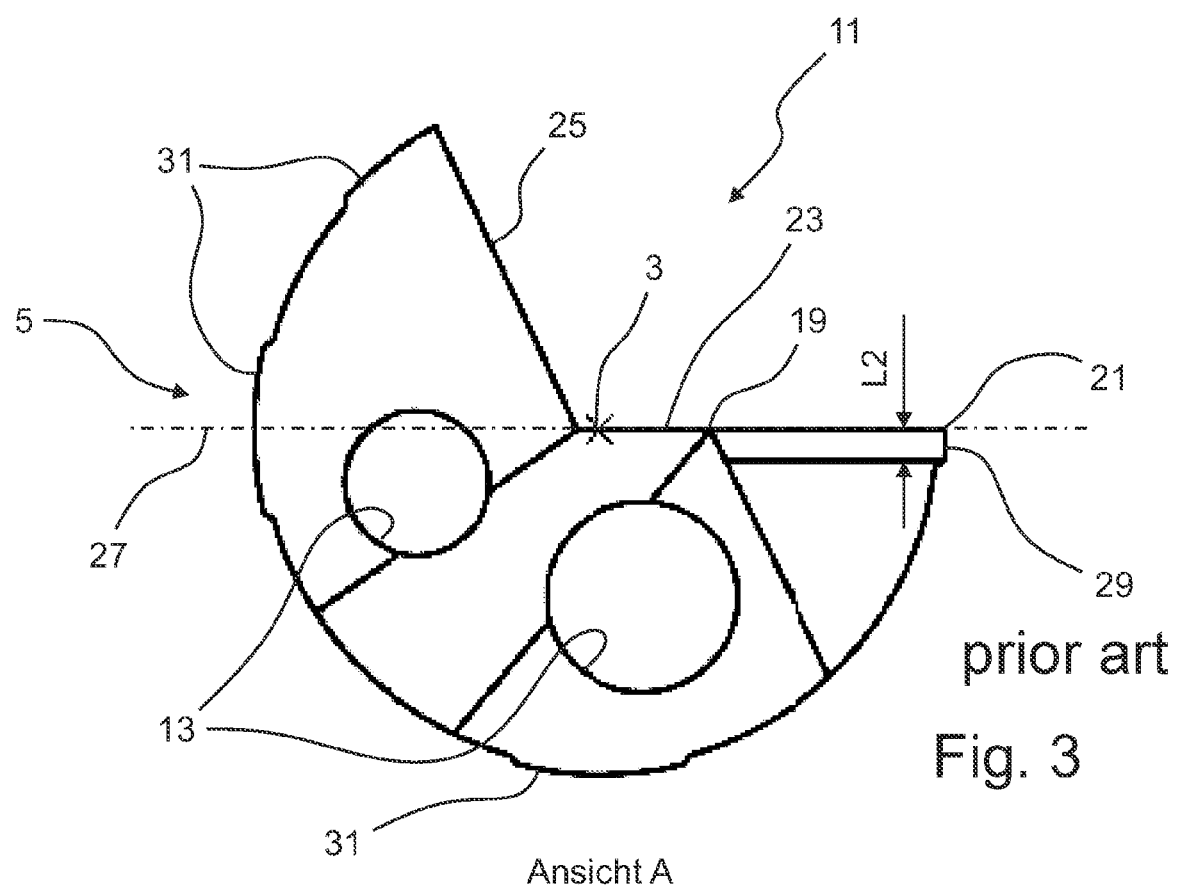

FIG. 3 shows a front view of the front end 15 of the single-lip drill 1. From this view, it is clear that in this embodiment two cooling channels 13.1 and 13.2 are formed in the drill head 5. However, it is also possible to provide only one cooling channel 13 or even three cooling channels 13.

In FIG. 3, the central axis 3 is shown as "X". Also easily recognizable is the longitudinal groove 11. It is delimited by a rake face 23 and a wall 25. The rake face 23 and the wall 25 form an angle of about 130°. In the illustrated exemplary embodiment, the rake face 23 extends through the central axis 3. A rake face plane 27 indicated by a dash-dotted line also runs through the central axis 3. The rake face plane 27 is a geometric definition that is not always visible on the single-lip drill. The rake face plane 27 is defined as being parallel to the rake face 23 and runs through the central axis 3.

When the rake face 23 passes through the central axis 3, the rake face plane 27 and rake face 23 coincide and one can see the rake face plane 27.

It has proven to be advantageous in some applications if the rake face 23 is about 0.01 mm to 0.05 mm below the rake face plane 27. In this case, the assignment "below" refers to the position of the rake face 23 and the rake face plane 27 shown in FIG. 3. This will prevent the drill from "pressing." This very small distance cannot be represented graphically in the figures.

In FIG. 3, the inner cutting edge 17.1 can be recognized as a line between the central axis 3 and the cutting tip 19. Accordingly, the outer cutting edge 17.2 is shown as a line between the cutting tip 19 and the minor cutting edge 21. In the front view, the inner cutting edge 17.1 and the outer cutting edge 17.2 coincide with the rake face 23. For the sake of clarity of FIG. 3, the reference numerals 17.1 and 17.2 not entered.

A plurality of guide pads 29 and 31 are distributed over the circumference of the drill head 5. Where the guide pad 29 and the rake face 23 intersect each other, they form the minor cutting edge 21. This guide pad is referred to below as circular land 29. The circular land 29 and the guide pads 31 have the task of guiding the drill head 5 in the borehole.

In order to reduce the friction between the drill head 5 and the wall of the borehole (not shown), the drill head 5, when viewed in the circumferential direction, is slightly set back/reduced in diameter between the circular land 29 and the guide pads 31.

This creates a gap between the borehole (not shown) and the drill head 5, which reduces the contact surface between the drill head 5 and the borehole on the circular land 29 and the guide pads 31. In addition, in these gaps coolant can be transported to the contact points between the drill head 5 and borehole.

Figure 4:
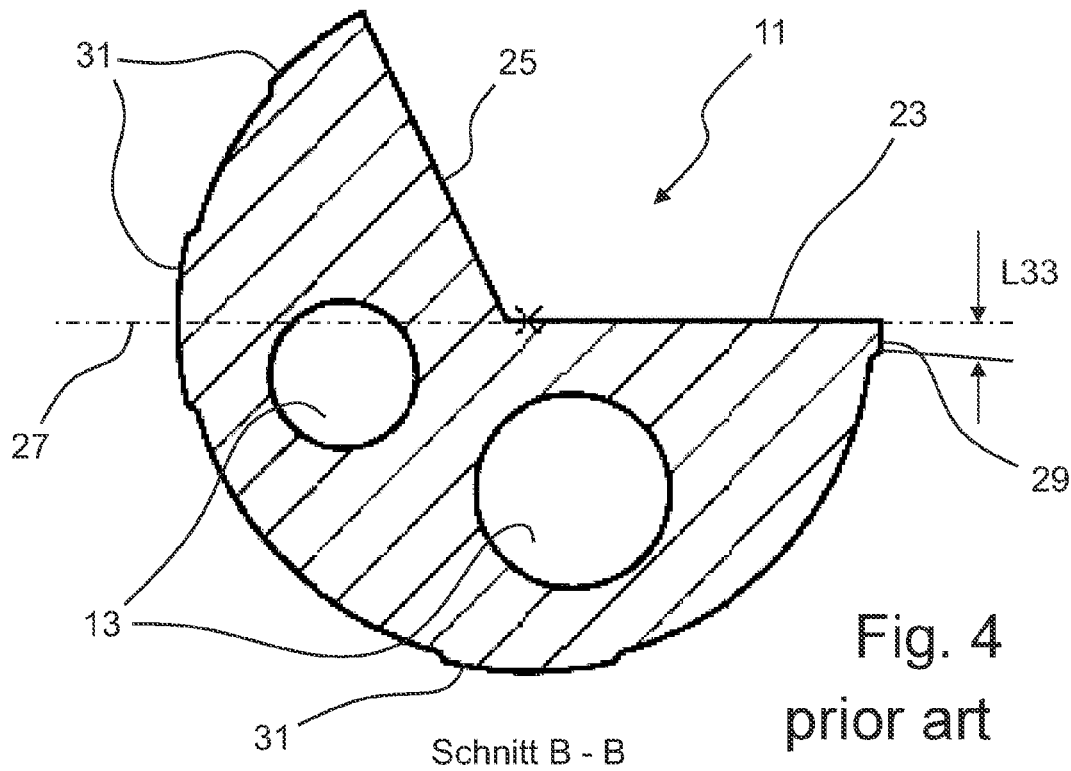

FIG. 4 shows a section through the drill head 5 along the line B-B according to FIG. 2.

The elements and components of the single-lip drill 1 shown and described with reference to FIGS. 1 to 4 are already known in principle from the prior art.

The further developments according to the invention of a single-lip drill 1 according to the invention will then be shown in different views with reference to FIGS. 5 to 12. For reasons of clarity, not all reference numerals have been entered in all figures. Thus, for example, in FIG. 5, the cooling channel 13 is not shown, although it is present.

Figure 5:
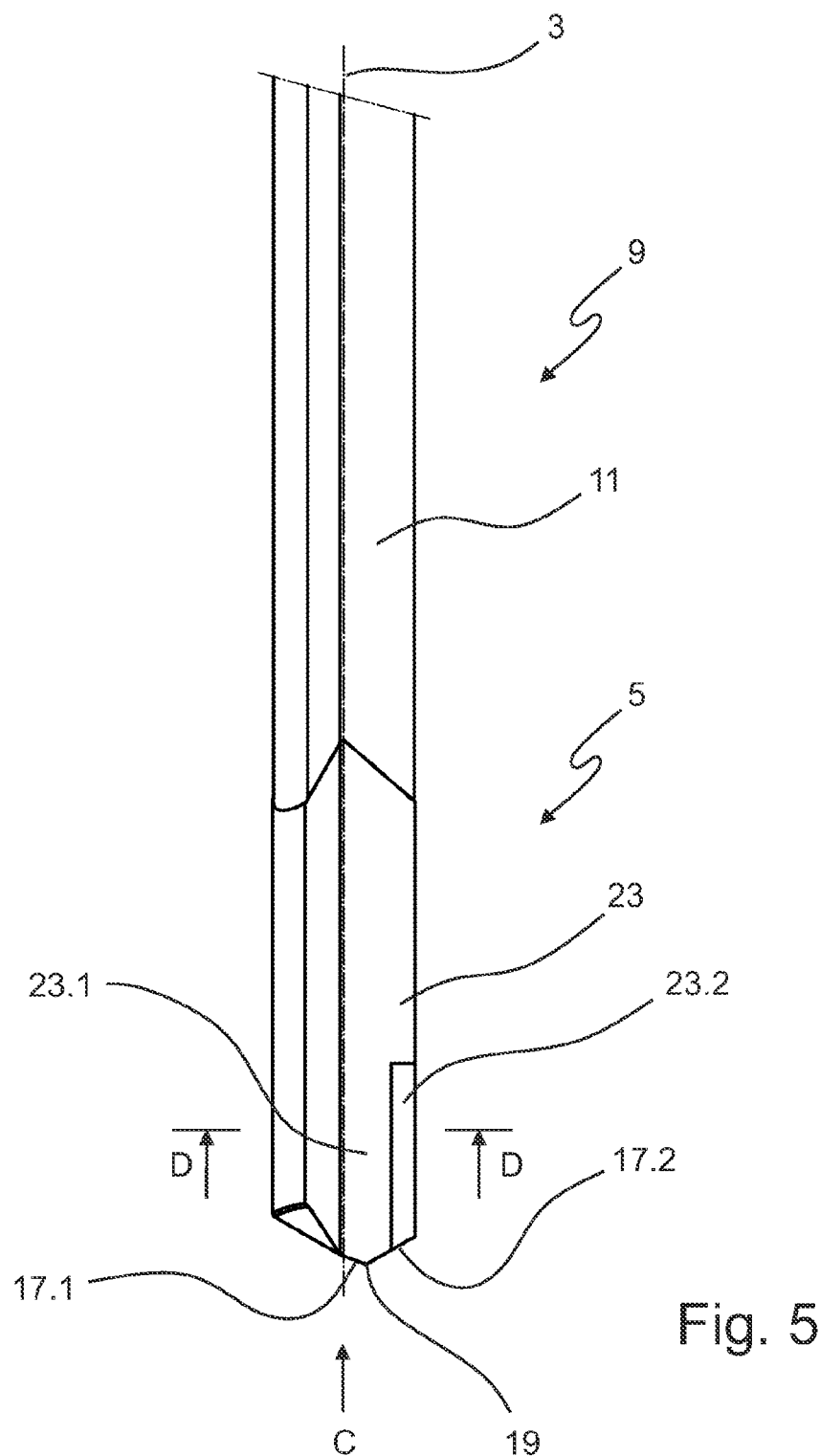

In FIG. 5, the front end 15 of a single-lip drill 1 according to the invention is similar to FIG. 2. FIG. 5 shows a rake face 23 according to the invention from above. It becomes clear here that the rake face 23 is subdivided, at least in the region of the drill tip 19, into an inner rake face 23.1 and an outer rake face 23.2.

In the illustrated embodiment, the outer rake face 23.2 has been made by grinding away a portion of the original rake face 23. This can be done in various ways, as explained below. FIG. 7 shows a first exemplary embodiment. It shows the section along the line D-D in FIG. 5 and the section along the line G-G from FIG. 6.

It is clear from FIG. 7 that the outer rake face 23.2 runs parallel to the inner rake face 23.1 and thus also parallel to the rake face plane 27. Since the outer rake face 23.2 extends in the axial direction of the drill tip 19 toward the clamping sleeve 7, the outer rake face 23.2 can be easily produced by grinding with a cylindrical grinding wheel. This creates a set-off between the inner rake face 23.1 and the outer rake face 23.2 with a face 35 which will be explained in detail below in connection with FIG. 12.

An angle α is entered between the outer rake face plane 23.2 and the face 35, which in this embodiment is 90°. The angle α is preferably in a range between 90° and 135°; values of 90°, 105°, 120° and 135° have proven in tests to be well suited.

It is thus also possible to produce the outer rake face 23.2 according to the invention from a single-lip drill 1 with a continuous rake face 23 (see FIGS. 1 to 4) by (re)grinding and thus to produce a single-lip drill according to the invention from a commercially available single-lip drill.

Figure 6:
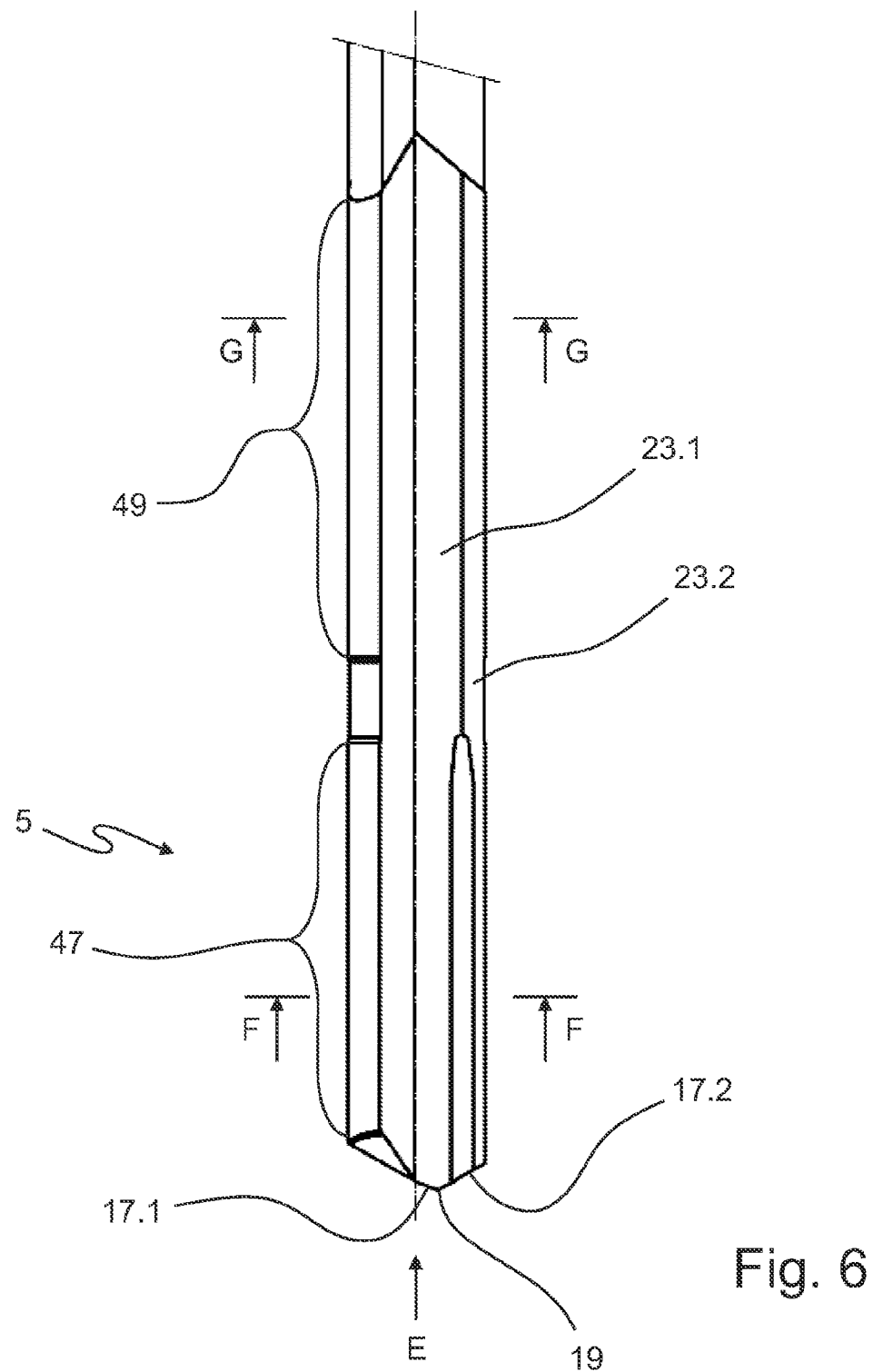

From a comparison of FIGS. 5 and 6, it is clear that the length in the axial direction of the outer rake face 23.2 can vary within wide limits. In the embodiment according to FIG. 5, the outer rake face 23.2 extends approximately over one third of the length of the drill head 5. In the embodiment according to FIG. 6, the outer rake face 23.2 extends over the entire length of the drill head 5.

In FIG. 6, two groups of guide pads are present. A first group 47 of guide pads 31 is formed adjacent to the tip 19. A second group 49 of guide pads is arranged axially spaced apart from the first group 47. As a result, an even better guidance of the drill head 5 is obtained in the borehole and, above all, the drill head 5 cannot swerve laterally and thereby lose the direction.

FIG. 8 shows a second exemplary embodiment of a single-lip drill according to the invention. It also shows sections along lines D-D and G-G in FIGS. 5 and 6. In this embodiment, the inner rake face 23.1 and the outer rake face 23.2 form an angle of about 170° to 175°. Also, this exemplary embodiment can be made from a single-lip drill 1 with a continuous rake face 23 (see FIGS. 1 to 4) by (re-)grinding.

In both cases, the outer rake face 23.2 is located in the region of the minor cutting edge 21 below the rake face plane 27. Also in this case, the assignment "below" refers to the illustration in FIGS. 7 and 8. It would also be possible to formulate the same situation in such a way that the outer rake face 23.2 is at a distance from the rake face plane 27 at least in the region of the minor cutting edge 21 and the rake face plane 27 extends in the region of the minor cutting edge in front of the outer rake face 23.2 in the direction of rotation of the single-lip drill.

Figure 9:
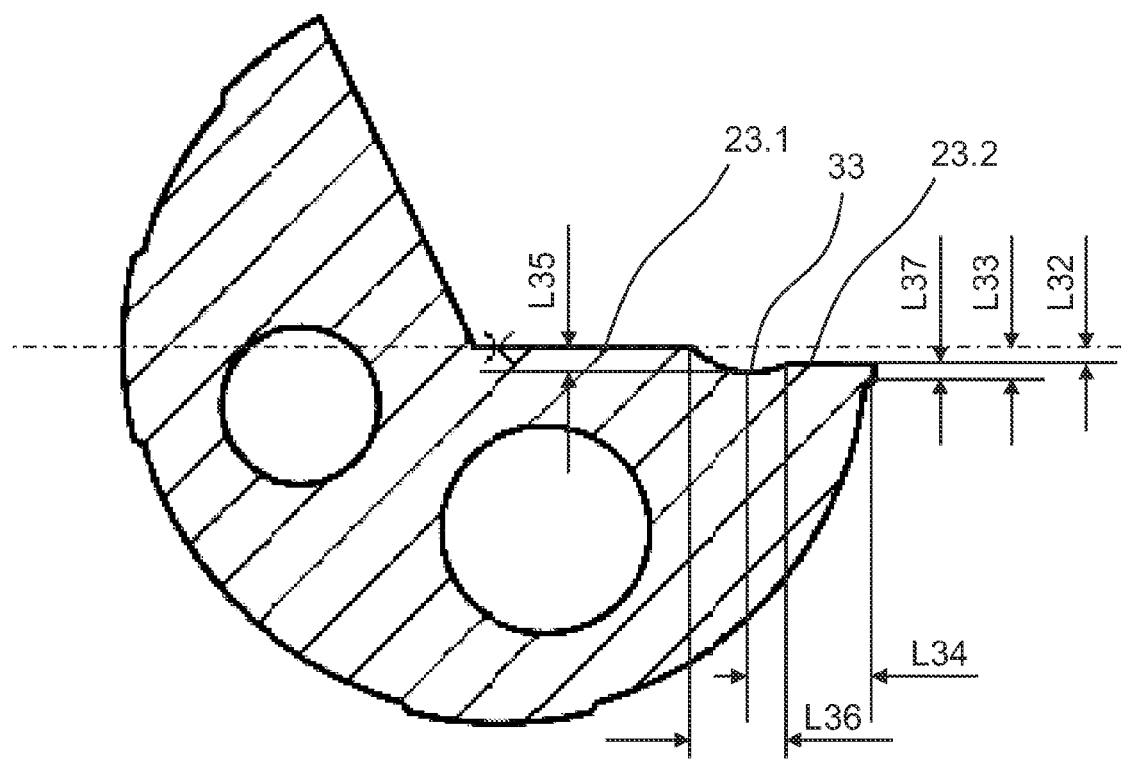
Figure 10:
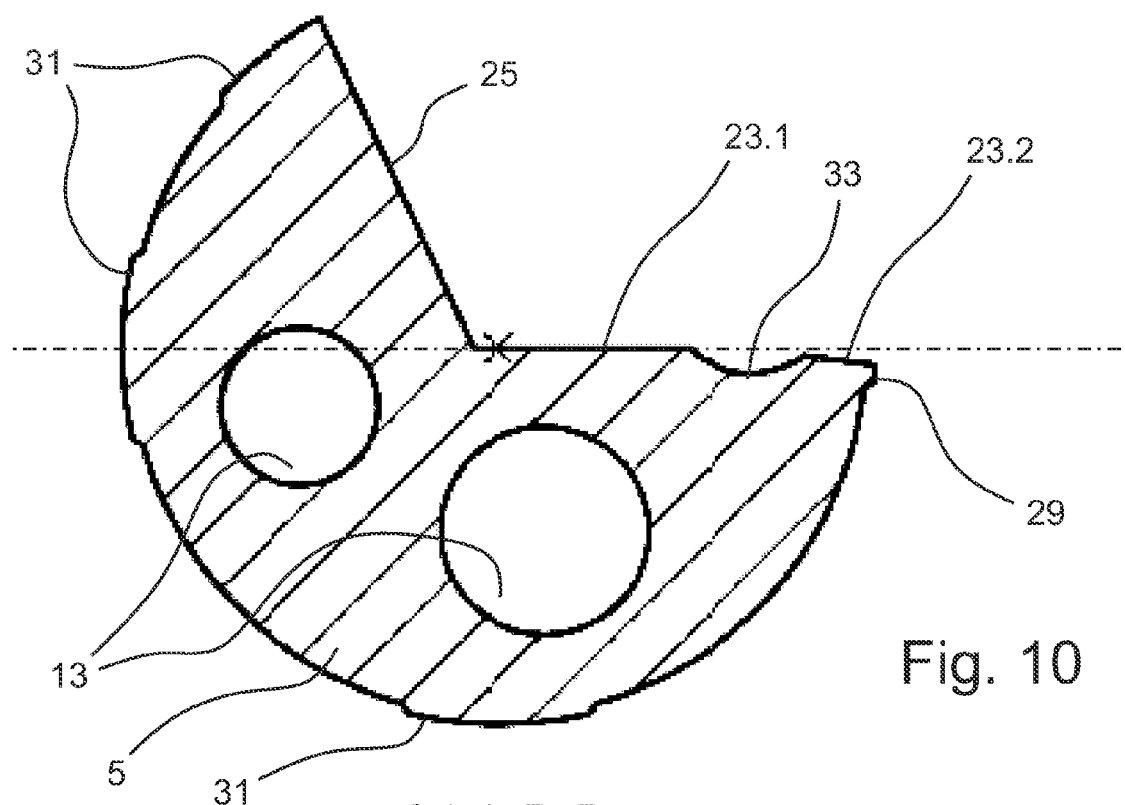

FIGS. 9 and 10 show two sections along the line F-F. FIG. 9 is a further design of the exemplary embodiment according to FIG. 7. FIG. 10 is a further design of the exemplary embodiment according to FIG. 8.

In FIG. 9, a chip breaker groove 33 is additionally created at the transition between the inner rake face 23.1 and the outer rake face 23.2. Also, the chip breaker groove 33 can be easily made by grinding in the axial direction with a correspondingly profiled grinding wheel. It is also conceivable to produce the chip breaker groove 33 and the outer rake face 23.2 with a correspondingly profiled grinding wheel in one operation.

FIG. 10 additionally shows the exemplary embodiment according to FIG. 8 with a chip breaker groove 33.

It is clear from a comparison of FIGS. 3 and 4 on the one hand to FIGS. 7, 8 and 9 that the width L37 of the circular land 29 is reduced to a certain degree as a side effect of producing the outer rake face 23.2.

This effect is desirable. It has surprisingly been found in experiments in connection with the geometry of the rake face 23 according to the invention that the drill head 5 is better guided in the borehole if the circular land 29 is narrower than usual.

Figure 11:
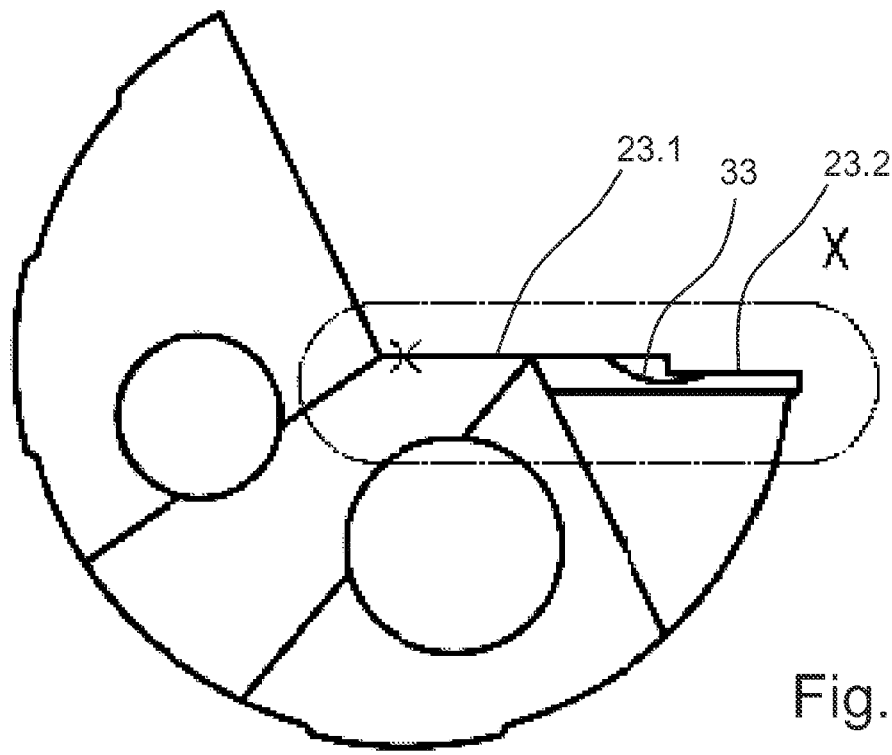

FIG. 11 shows a front view of the exemplary embodiment according to FIG. 6. Because in this embodiment, the chip breaker groove 33 does not extend over the entire length of the drill head 5, the set-off between the inner rake face 23.1 and the outer rake face 23.2 can be seen in this view.

Figure 12:
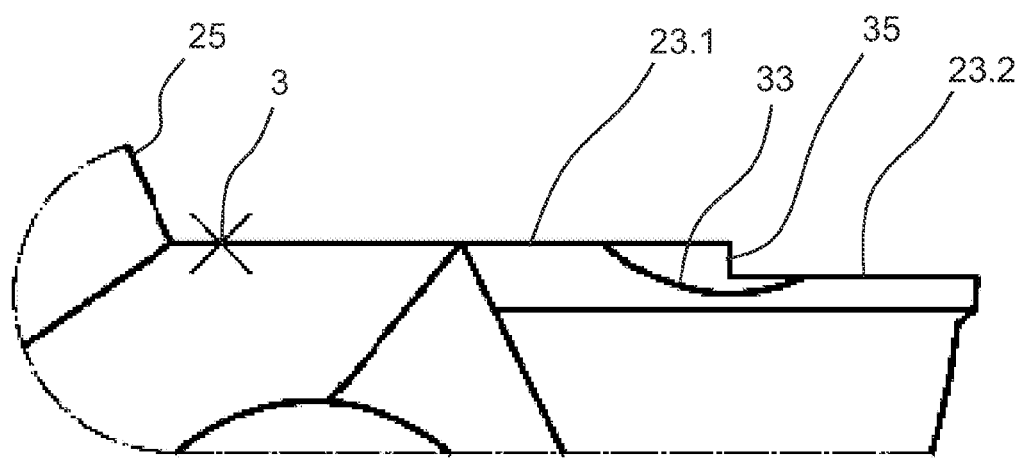

In FIG. 12, the detail x from FIG. 11 is shown enlarged. From this enlarged view, it is clear that the set-off between the inner rake face 23.1 and the outer rake face 23.2 is bridged by a face 35. In this embodiment, the face 35 is formed at a right angle to the inner and outer rake faces 23.1 and 23.2.

According to the invention, it is also possible, for example, that the angle between the face 35 and the outer rake face 23.2 is greater than 90°. It can be, for example, 105° or 120°. It is also not mandatory for a sharp edge to be present between the face 35 and the inner rake face 23.1. It is also possible that a radius is formed there.

Depending on requirements, the entire drill head 5 can be provided with a functional coating. However, it is also possible that only partial regions are provided with a functional coating; for example, the rake face (23.1 and/or 23.2) can be provided with a wear protection coating. The same also applies for the circular land 29 and the guide pads 31.

The interaction of the cutting forces acting on the drill head 5 results in the central course of the boreholes drilled with a single-lip drill 1 according to the invention being markedly better than in the case of a conventional single-lip drill having a continuous rake face, as shown in FIGS. 2 to 4. This effect is demonstrated below by comparing the diagrams in FIGS. 13 and 14.

Figure 13:
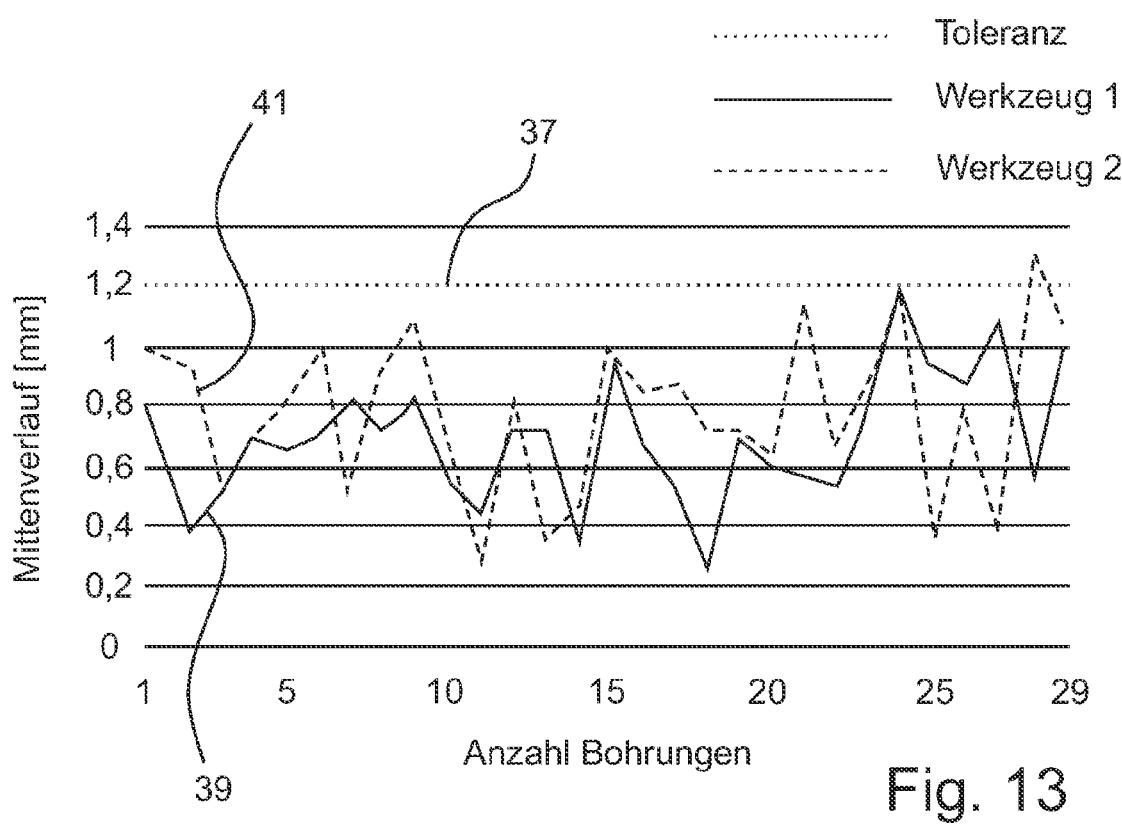

In FIG. 13, the result of an evaluation of a plurality of boreholes is shown in diagram form. The boreholes were made with a conventional single-lip drill 1 according to FIGS. 1 to 4. In this case, the hole straightness deviation is plotted in millimeters as a function of the number of boreholes.

The hole straightness deviation is seen in the drilling process as the deviation of the actual borehole course (=the position of the center axis of the actual borehole) from the theoretical center axis of the borehole to be produced at the end of the drilling. The hole straightness deviation is an aspect of the bore quality. An effort is made to obtain the smallest possible hole straightness deviation. Ideally, if the actual borehole is exactly where it should be, the hole straightness deviation is zero. Single-lip drills are distinguished from other drills by a comparatively small hole straightness deviation.

A tolerance limit for the hole straightness deviation is illustrated by the horizontal line 37. A first line 39 shows the values of the hole straightness deviation determined in connection with a tool 1. A second line 41 shows the corresponding values attained with a tool 2 of the same design.

It can be seen in both lines 39 and 41 that with an increasing number of boreholes, that is with increasing wear of the cutting edge, the hole straightness deviation tends to get worse. This means that the borehole swerves more and more laterally. Line 39 reaches the tolerance limit 37 at the 24th borehole. In the case of the tool 2 (see the line 41), the tolerance 37 is even exceeded by the 28th borehole.

This situation is not optimal, because the tool must be reground as soon as the hole straightness deviation comes close to the tolerance limit. If the hole straightness deviation is exceeded, the machined workpiece is a reject.

Figure 14:
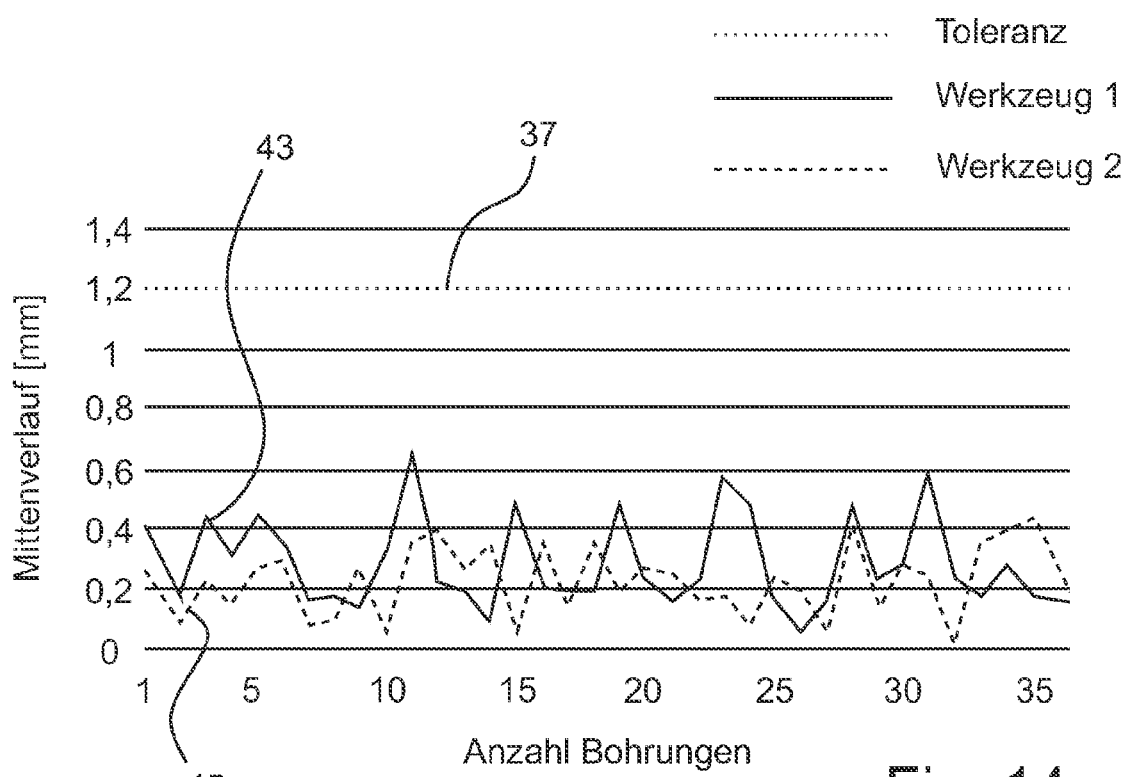

FIG. 14 shows the results of an evaluation of the results attained with two tools according to the invention. Otherwise, the boundary conditions of the experiments with conventional single-lip drills and single-lip drills according to the invention were the same.

The lines 43 and 45 in FIG. 14 show the results of a first tool according to the invention and a second tool according to the invention. It is clear in the comparison with FIG. 13 that, firstly, the hole straightness deviation assumes much smaller values. The largest value of the hole straightness deviation is about 0.6 mm (see line 43 at borehole no. 11). In addition, it can be seen that the hole straightness deviation remains almost constant over the number of boreholes, so that the entire service life of the tool according to the invention can be utilized.

In other words: the ground face according to the invention has increased the endurance significantly and at the same time the hole straightness deviation has been reduced to about half. This impressive effect results from the provision according to the invention of an outer rake face 23.2. Ideally, this outer rake face 23.2 is still combined with a chip breaker groove 33. At the same time, the width of the circular land 29 is reduced.

All measures required for this can be realized by manufacturing technology using grinding operations in the longitudinal direction of the drill head 5.

This geometry is incorporated by manufacturer in the drill head 5 and does not have to be revised when a single-lip drill 1 has become dull.

This means that a single-lip drill 1 which has become dull can be reground even by the customer in the simplest way. For this purpose, only some material in the region of the cutting edge 17 on the clearance face needs to be removed. The rake face 23.1 and 23.2 need not be machined by the customer for the regrinding. Therefore, a single-lip drill 1 according to the invention can very often be reground.

Furthermore, any anti-wear coating present on the rake face 23.1 and 23.2 as well as the circular land 29 and the guide pads 31 can be retained when the drill is reground.

In the following, some terms are explained and defined in keywords.

Single-lip drills are a special variant of the deep-hole drilling tools. Deep-hole drilling tools are understood to mean tools that work according to various known deep-hole drilling systems, i.e. BTA, ejector, single-lip drill, etc.

Single-lip drills are long and slender and have a central axis. They are used to make boreholes with a large length to diameter ratio. They are mainly used in industrial metalworking, as in the production of engine components, especially in the production of common rails or transmission shafts.

Single-lip drills are usually used in a diameter range of approx. 0.5 to 50 mm. Boreholes with a length of up to 6,000 mm are possible.

The ratio of length to diameter (L/D) of the borehole is usually in a range of about 10 to over 100; but it can also be about 5 and up to about 250.

Single-lip drills are characterized in that a borehole of high quality can be produced in one stroke. They can be used in machine tools such as lathes, machining centers or special deep-hole drilling machines.

The cutting operation is performed by a movement of the drill relative to the workpiece in the direction of rotation about a common center axis, and a relative movement of the drill on the workpiece in the direction of the common center axis (feed movement). The rotational movement can be done by the drill and/or the workpiece. The same applies for the feed movement.

The deviation [mm] of the actual borehole course from the theoretical center axis of the drill is seen as the hole straightness deviation during the drilling operation. The hole straightness deviation is an aspect of the bore quality. An effort is made to obtain the smallest possible hole straightness deviation. Ideally, no hole straightness deviation occurs at all. Single-lip drills are distinguished from other drills by a comparatively small hole straightness deviation.

The hole straightness deviation depends, among other things, on whether the rotary movement is performed by the drill or the workpiece or by both. Experience shows that the smallest hole straightness deviation values are attained when the rotary motion is performed by the workpiece or by the workpiece and drill.

Coolant, or a mixture of coolant and air (minimum quantity lubrication) for lubricating and cooling the drill head and the guide pads and for flushing out the chips, is transported through the cooling channel. Coolant is supplied under pressure at the rear end, passes through the cooling channel and exits at the drill head. The pressure depends on the diameter and on the length of the drill.

By adjusting the pressure of the coolant, single-lip drills can drill very small and very deep boreholes in one pass.

The drill head has at least one cutting edge; there may also be a plurality of cutting edges. The cutting edge is the region involved in machining; it is formed by the rake face and clearance face. The rake face is the region where the chip runs off; it may also consist of a plurality of partial surfaces (see the reference numerals 23.1 and 23.2 in the figures).

In the case of solid boring tools, the cutting edge extends from the central axis of the drill head to its periphery. The clearance face is the surface at the tip of the drill bit that is opposite the machined workpiece surface.

The cutting edge is the contact line between rake face and clearance face. The cutting edge is usually divided into a plurality of straight partial cutting edges.

The overall shape of all cutting and non-cutting surfaces on the face side of the drill head is referred to as a ground face. This also includes surfaces that are not directly adjacent to the cutting edges, such as surfaces for directing the flow of coolant or additional clearance faces in order to allow the drill to cut cleanly.

The ground face determines to a large extent the formation of the chips and is fine-tuned to the material to be machined. The objectives of the fine-tuning are, among other things, the shaping of chips that is as favorable as possible, a high machining speed, the longest possible service life of the drill and adherence to the required quality features of the borehole, such as diameter, surface or straightness (hole straightness deviation).

The drill head consists of a material suitable for cutting, usually carbide, but also cermet, ceramic or other suitable materials.

The carbide used is usually cemented carbide with the components WC and Co.

The cutting wears down the cutting edge, making the drill unusable.

Regrinding can enable a single-lip drill that has become blunt to be usable again. Regrinding means a usually frontal cutting back/grinding of the worn part of the drill head until all worn regions (in particular of rake face and clearance face) are removed and a new and sharp cutting edge is produced. Thereafter, the ground face again has its original shape.

A drilling tool can be reground until a complete ground face can no longer be applied to the drill head or until the guide chamfers and pads that are becoming shorter result in there no longer being sufficient guidance of the tool.

To increase the service life of the drill head, it may be provided with a coating as wear protection; usually from the metal nitrides or metal oxides groups; also in a plurality of alternating layers. The thickness is usually about 0.0005 to 0.010 mm. The coating is applied by chemical or physical vacuum coating methods. The coating can be provided on the circumference of the drill head, on the clearance faces or on the rake faces; in some cases, even the entire drill head can be coated.

During the regrinding, the coating is removed by the grinding wheel at least on the surfaces that are reground. On the other surfaces of the ground face, the coating is retained.

Guide pads are arranged on the circumference of the drill head for supporting the cutting forces in the drilled borehole during cutting.

Guide pads are cylindrical segments with the diameter of the drill head; they are in contact with the borehole wall during the drilling process. In the circumferential direction between the guide pads on the drill head, radially recessed segments with a smaller diameter are arranged in such a way that a gap between the borehole wall and drill head is formed. The gap serves to accumulate coolant for cooling and lubricating the guide pads.

There are various arrangements of guide pads, the design depending on the material to be machined. The first guide pad, which adjoins the rake face counter to the direction of rotation of the drill, is referred to as a circular land.

The contact line (edge) between rake face and circular land is called a minor cutting edge. The point of intersection between outer cutting edge and minor cutting edge is called the cutting corner.

The invention claimed is:

1. A single-lip drill comprising a drill head, wherein the drill head has a rotational axis, a drill diameter (D), a cutting edge and a longitudinal groove for chip removal, the cutting edge extending from the rotational axis to the diameter (D) of the drill head, the cutting edge having a rake face, characterized in that the rake face comprises an inner rake face and an outer rake face, that the inner rake face is radially to the inside and in the immediate vicinity of the axis of rotation, that the outer rake face is radially to the outside and adjoins the inner rake face, that the inner rake face is in a view from the front toward the drill head in the immediate vicinity of a rake face plane, and that the outer rake face in a view from the front toward the drill head at least in the region of the cutting edge is below the rake face plane, the single-lip drill further comprising a chip breaker groove positioned between the inner rake face and the outer rake face.

2. The single-lip drill according to claim 1, characterized in that the inner rake face and the outer rake face run parallel to each other.

3. The single-lip drill according to claim 1, characterized in that the inner rake face and the outer rake face form an obtuse angle.

4. The single-lip drill according to claim 1, characterized in that a set-off is present between the inner rake face and the outer rake face.

5. The single-lip drill according to claim 1, further comprising and characterized by a minor cutting edge located below the rake face plane, and that a distance between rake face plane and minor cutting edge is between 1% and 5% of the drilling diameter (D).

6. The single-lip drill according to claim 1, characterized in that it comprises at least one guide pad.

7. The single-lip drill according to claim 6, characterized in that the guide pad is formed as a circular land, and that a height of the circular land is between 1% and 4% of the bore diameter (D).

8. The single-lip drill according to claim 6, characterized in that it comprises two groups of guide pads, that a first group of guide pads is arranged in the region of a drill tip, and that a second group of guide pads is arranged axially spaced apart from the first group on the drill head.

9. The single-lip drill according to claim 1, characterized in that it comprises a clamping sleeve and a shank, and in that the longitudinal groove is formed in the drill head and at least partially in the shank.

10. The single-lip drill according to claim 1, characterized in that at least the drill head consists of carbide.

11. The single-lip drill according to claim 9, characterized in that both the drill head and the shank consist of carbide.

12. The single-lip drill according to claim 1, characterized in that the drill head is at least partially provided with a hard material coating.

13. A method for manufacturing a single-lip drill, the single-lip drill comprising a drill head, wherein the drill head has a rotational axis, a drill diameter (D), a cutting edge and a longitudinal groove for chip removal, the cutting edge extending from the rotational axis to the diameter (D) of the drill head, the cutting edge having a rake face, characterized in that the rake face comprises an inner rake face and an outer rake face, that the inner rake face is radially to the inside and in the immediate vicinity of the axis of rotation, that the outer rake face is radially to the outside and adjoins the inner rake face, that the inner rake face is in a view from the front toward the drill head in the immediate vicinity of a rake face plane, and that the outer rake face in a view from the front toward the drill head at least in the region of the cutting edge is below the rake face plane, the single-lip drill further comprising a chip breaker groove positioned between the inner rake face and the outer rake face, the method comprising the following steps: producing a drill head starting from a blank by grinding.

14. The method according to claim 13, comprising the further step of grinding at least one of the outer rake face and the chip breaker groove from an existing drill head with a rake face which is in a view from the front toward the drill head in the immediate vicinity of a rake face plane.

15. The method according to claim 13, comprising the further step of providing a functional coating on at least a portion of the surface of the drill head.

\* \* \* \* \*